United States Patent
Simon Bacardit

[19]

[11] Patent Number: 5,881,628
[45] Date of Patent: Mar. 16, 1999

[54] BRAKE SERVO WITH SELECTIVE PNEUMATIC FEEDBACK

[75] Inventor: Juan Simon Bacardit, Drancy, France

[73] Assignee: Bosch Systems De Frenado, S.L., Barcelone, Spain

[21] Appl. No.: 849,592
[22] PCT Filed: May 14, 1997
[86] PCT No.: PCT/FR97/00851
    § 371 Date: May 28, 1997
    § 102(e) Date: May 28, 1997
[87] PCT Pub. No.: WO98/05541
    PCT Pub. Date: Feb. 12, 1998

[30]    Foreign Application Priority Data

Aug. 5, 1996  [FR]  France ................................. 96 09933

[51] Int. Cl.⁶ ...................................................... F15B 9/10
[52] U.S. Cl. ............................................ 91/369.1; 91/434
[58] Field of Search ............................... 91/369.1, 376 R, 91/434; 60/552

[56]                References Cited

U.S. PATENT DOCUMENTS 2,796,154   6/1957   Stelzer ................................... 91/369.1

*Primary Examiner*—F. Daniel Lopez
*Attorney, Agent, or Firm*—Leo H. McCormick, Jr.; Warren Comstock

[57]                 ABSTRACT

A pneumatic brake booster comprising two working chambers, with each working chamber communicating a respective one of two reaction chambers. A divider dividing the reaction chambers provides a pressure feedback force to an input shaft. A selective valve (13) allows communication (C2) provided between the rear working chamber and the front reaction chamber to be closed, at least partially, when an airflow from the rear working chamber towards the front reaction chamber is higher than a predetermined amount. This allows the response time of the booster is adjusted.

3 Claims, 2 Drawing Sheets

BRAKE SERVO WITH SELECTIVE PNEUMATIC FEEDBACK

The present invention relates to a pneumatic booster, especially one which can be used to boost the braking in motor vehicles, comprising: a rigid casing divided in leaktight fashion into at least two working chambers, the first of which is connected to a first pressure source delivering a first pressure, and the second of which can be connected selectively, by means of a three-way valve, to the first source or to a second pressure source delivering a pressure different from the first; a moving partition delimiting the two working chambers inside the casing and including a rigid skirt, it being possible for this moving partition to be urged by a boost force resulting from a difference in pressure set up selectively between the two working chambers by actuation of the three-way valve; a pneumatic piston capable of carrying the skirt along in a first axial direction and containing the three-way valve; an operating rod also accommodated in the piston and able to receive an input force controlling the actuation of the three-way valve; a push rod able to move axially with respect to the operating rod and able to receive, in order to transmit it on, an output force which is orientated in the first axial direction and which is composed of the input force and of the boost force; and reaction means interposed between the operating rod and the push rod in order to apply to the operating rod, counter to the input force, a reaction which can increase with the boost force.

Devices of this type, well known in the prior art, are applied to a very great number of motor vehicles these days to provide assistance with braking.

These devices generally use a reaction disc formed of an elastomeric material, by way of essential reaction means, and this is entirely satisfactory and will undoubtedly continue to be so for a long time.

However, and despite the traditional nature of the techniques involved, boosters continue to be the subject of substantial amounts of research aiming to optimize their operating characteristics.

Included among this research there feature especially current attempts at improving the definition of the dynamic performance of boosters, and more precisely at reducing the tolerances on those of their operating characteristics which are liable to vary as a function of the speed with which they are actuated.

The present invention falls within this context, and its object is to provide a booster which, for mass-production, has greater reproducibility of operation than current boosters, together with a response time which is selectively shorter.

To this end, the booster of the invention is essentially characterized in that the reaction means comprise: a fixed volume defined, in a central region of the skirt, between first and second rigid walls with which this skirt is equipped and which point respectively towards the first and second working chambers; a moving divider dividing the fixed volume into first and second reaction chambers respectively delimited in part by the second and first rigid walls; first and second communications respectively connecting the first working chamber and first reaction chamber together, and connecting the second working chamber and second reaction chamber together; and a selective valve capable of closing the second communication off at least partially in response to an air flow higher than a predetermined value established from the second working chamber towards the second reaction chamber, the first rigid wall of the skirt being shaped so that it can, at least indirectly, carry the push rod along in the first axial direction, and the divider being shaped so that it can, at least indirectly, carry the operating rod along in a direction which is the opposite direction to the first axial direction.

Although the author of the present invention is already the author of a related device which is not yet known publicly, but has already been the subject, on 31 Mar. 1995, of the filing of French Patent Application FR 95 03839, the booster proposed here can be distinguished from the prior art by the fact that it comprises a selective valve controlling the flow of air travelling from the second working chamber towards the second reaction chamber.

Thanks to this selective valve, the booster proposed reacts against the breaking effort applied by the driver more weakly, the faster the braking effort which allows the response of the booster to be adapted to the demand made on it, for greater breaking efficiency and greater comfort for the driver.

In addition, insofar as the viscosity of air varies relatively little as a function of temperature, the adapted characteristics of the booster give excellent stability.

The selective valve may, for example, comprise a shutter member engaged in such a way that it can move in the second communication, pushed back by a valve spring towards a wide open position, and pushed towards a minimally open position by a flow of air travelling from the second working chamber towards the second reaction chamber.

According to another possible embodiment, the selective valve comprises an elastic leaf which spontaneously keeps away from the second communication and can become pressed against the second communication under the effect of a flow of air travelling from the second working chamber towards the second reaction chamber.

Other features and advantages of the invention will emerge clearly from the description thereof given hereafter by way of non-limiting indication with reference to the drawings, in which.

Figure 1:
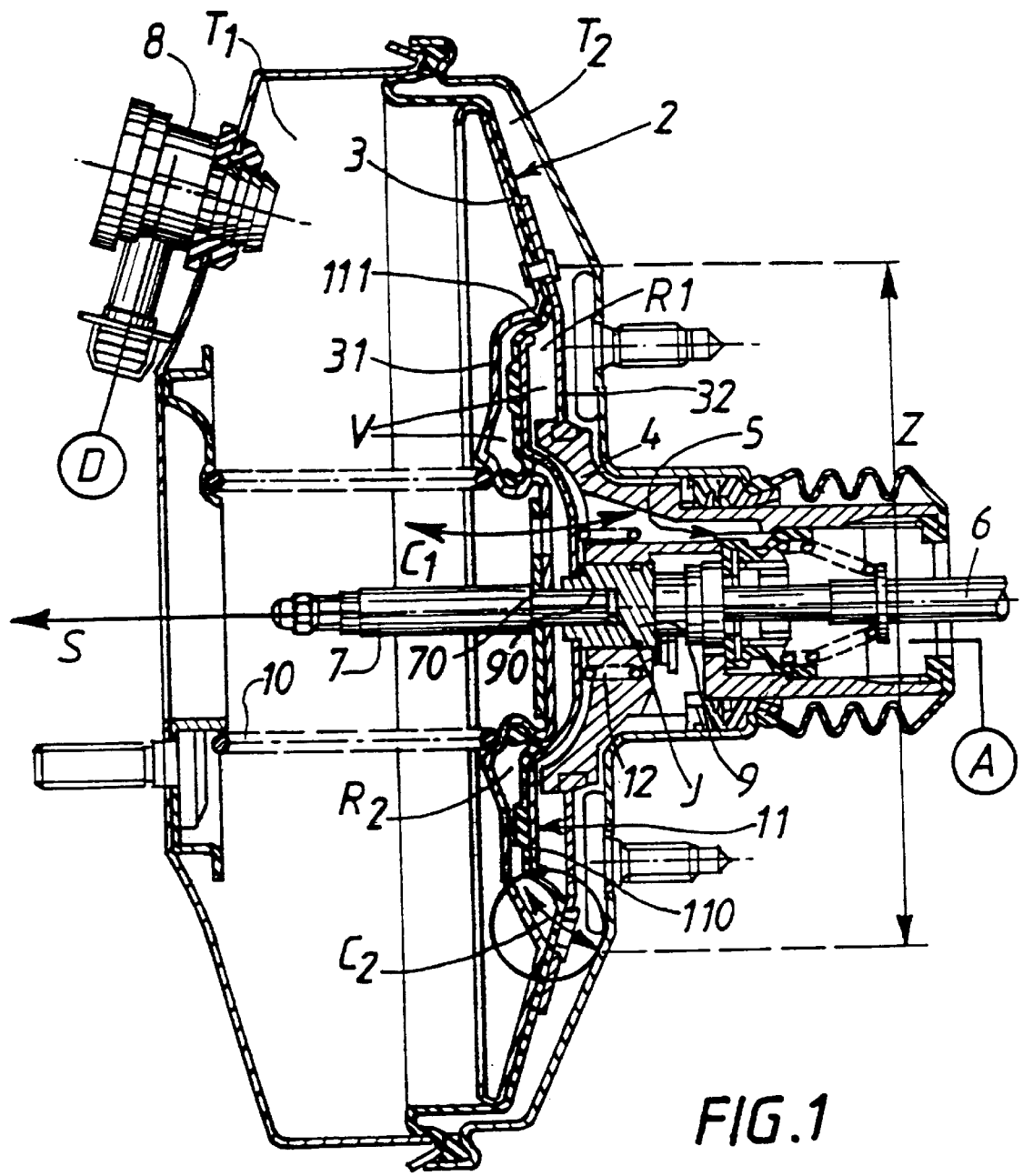
FIG. 1 is a sectional view through a booster incorporating the features of the invention, except for the selective valve which constitutes the special contribution of the present proposal.

In a way known per se, this pneumatic booster comprises (FIG. 1) a rigid casing 1, a moving partition 2 including a rigid skirt 3, a pneumatic piston 4, a three-way valve 5, an operating rod 6, a push rod 7, and reaction means interposed between the control rod 6 and push rod 7, the improvement to which more specifically forms the subject of the invention.

The moving partition 2 divides the internal volume of the rigid casing 1 in leaktight fashion into two working chambers T1 and T2 of complementary and variable volume.

The first working chamber T1 is connected to a low pressure source D via a non-return valve 8, and the second working chamber T2 can be connected selectively, by means of the three-way valve 5, either to the low pressure source D, or to a source A of relatively high pressure, for example the atmosphere.

By virtue of this arrangement which is known per se, actuation of the three-way valve 5 which connects the second working chamber T2 to the second source A causes a pressure difference between the two working chambers T1 and T2, the moving partition 2 thus finding itself urged by a force which represents the boost force of the booster, and moving inside the casing 1 against the force exerted by a spring 10, carrying the pneumatic piston 4 integral with the skirt 3 along with it.

In practice, the three-way valve 5 is borne by the piston 4, and it is made to open to the working chamber T2 by applying an input force in the axial direction S to the operating rod 6, this rod itself being borne by the piston 4 and ending in a feeler 9.

The push rod 7 is mounted so as to be able to move axially relative to the operating rod 6, and can receive an output force also orientated in the axial direction S, this output force being transmitted on to a master cylinder (not represented), and being composed of the input force and of the boost force.

As explained previously, the invention relates more specifically to an improvement to the so-called "reaction" means which are interposed between the operating rod 6 and the push rod 7, in order to apply to the operating rod, against the input force, a reaction which can increase with the boost force.

In a booster in accordance with the invention, these reaction means comprise: a fixed volume V defined, in a central region Z of the skirt 3, between two rigid walls 31, 32 of this skirt 3; a moving divider 11 dividing the fixed volume V into two reaction chambers R1 and R2; a first communication C1 connecting the working chamber and reaction chamber T1 and R1 together, and a second communication C2 connecting the working chamber and reaction chamber T2 and R2 together.

As FIG. 1 shows, the rigid walls 31, 32 of the skirt 3, respectively pointing towards the working chambers T1 and T2 respectively delimit, in part, the reaction chambers R2 and R1, moreover separated from one another by the moving divider 11.

For example, the moving divider 11 is formed in the same way as the moving partition 2 and comprises a rigid auxiliary skirt 110 and a flexible diaphragm 111 which may, as represented in the figure, be common to this divider and to the moving partition 2.

Thus, in the specific case of the booster illustrated, the communication C1 passes through the rigid wall 31 of the skirt 3 and the rigid auxiliary skirt 110, while the communication C2 passes through the rigid wall 32 of the skirt 3 and the flexible diaphragm 111.

Transmission of the boost force is ensured through the fact that the rigid wall 31 of the skirt 3 is shaped so that it can come into abutment, in the axial direction S, against a shoulder 70 of the push rod 7, and can thus carry this push rod 7 along with it in this axial direction S.

Furthermore, the application of the reaction to the operating rod 6 is ensured through the fact that the divider 11, and more specifically the rigid auxiliary skirt 110, is shaped so that it can come into abutment, in an opposite direction to the axial direction S, against a shoulder 90 of the feeler 9, and can thus carry the operating rod 6, integral with the feeler 9, along with it in an opposite direction to the axial direction S.

The booster preferably further comprises a prestressed spring 12 interposed between the divider 11 and the pneumatic piston 4 in order to define the minimum value (termed "jump") of the boost force which can be produced by the booster.

The booster described hitherto, and therefore not yet comprising all the features of the invention operates as follows.

In the position of rest of the booster, the spring 12 which pushes the auxiliary skirt 110 back away from the piston 4 and therefore from the shoulder 90 of the feeler 9, reveals between this auxiliary skirt and this shoulder a clearance which tends to reduce as soon as an input force is applied to the operating rod 6.

Furthermore, the working chambers T1 and T2 which remain in communication with one another via the valve 5 for as long as the booster is in the position of rest, become isolated from one another as soon as the input force starts to be applied, after which the valve 5 connects the rear working chamber T2 to the atmosphere A in a way known per se.

However, atmospheric air also admitted progressively into the reaction chamber R2 through the communication C2 pushes the divider 11 in an opposite direction to the axial direction S until the clearance between the auxiliary skirt 110 and the shoulder 90 of the feeler 9 is taken up, the booster then adopting the position represented in FIG. 1.

Beyond this position, the moving partition 2, urged by the pressure difference created between the working chambers T1 and T2, moves in the direction S, compressing the spring 10 and applying to the push rod 7 a force which is proportional to the input force applied to the operating rod 6, the proportionality being ensured by the reaction transmitted by the divider 11 to the push rod 6 via the feeler 9.

This method of operation continues until the pressure in the chambers T2 and R2 is close to atmospheric pressure, and until the clearance J which until that time existed between the feeler 9 and the push rod 7 is taken up (saturation phase), any subsequent increase in the input force then being transmitted directly to the push rod 7 via the feeler 9 bearing directly against this rod 7.

However, as indicated earlier, a booster in accordance with the invention comprises, in addition to the elements already described, a selective valve 13 capable of closing the second communication C2 off, at least partially, in response to a flow of air higher than a predetermined value established from the second working chamber T2 towards the second reaction chamber R2, the presence of such a selective valve having the effect that a booster in accordance with the invention adopts the operation described earlier only if acted upon by a braking effort which evolves relatively slowly.

According to a first possible embodiment (FIGS. 2 and 3), the selective valve 13 comprises a shutter member 131 engaged in such a way that it can move in the second communication C2, pushed back by a valve spring 132 towards a wide open position, and pushed towards a minimally open position by a flow of air travelling from the second working chamber T2 towards the second reaction chamber R2.

Figure 2:
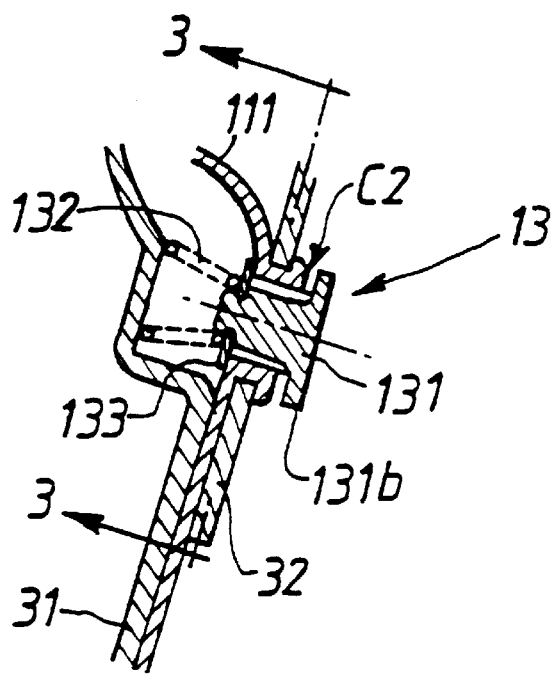
FIG. 2 is an enlarged sectional view of the ringed part of FIG. 1 for a booster comprising all the features of the invention, this figure representing a first possible embodiment of a selective valve.
Figure 3:
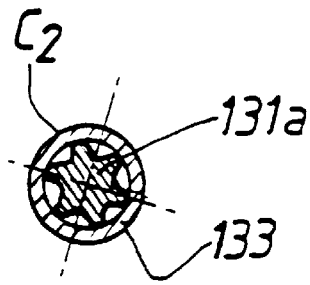
FIG. 3 is a sectional view of the selective valve, taken on the line 3—3 of FIG. 2.

As FIGS. 2 and 3 show, the shutter member 131 is essentially composed of a fluted body 131a inscribed inside a cylinder, and of a rim 131b which can close off the communication C2 when the dynamic pressure of the air passing through the latter applies to the shutter member 131 a force which is high enough to overcome the force of the spring 132.

Moreover, a washer 133 secured to the shutter member 131 at its end furthest from the rim 131b can bear against the edge of the communication C2 to define the extreme position that this shutter member is allowed to adopt under the effect of the force of the spring 132.

Figure 4:
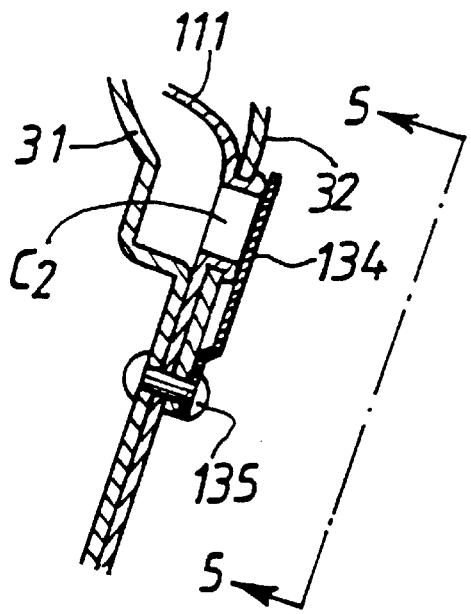
FIG. 4 is an enlarged sectional view of the ringed part of FIG. 1 for a booster comprising all the features of the invention, this figure representing a second possible embodiment of a selective valve.
Figure 5:
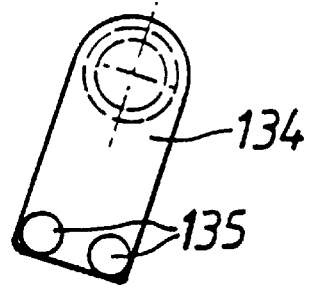
FIG. 5 is a plan view of the selective valve observed from the direction 5—5 of FIG. 4.

According to a second possible embodiment (FIGS. 4 and 5) the selective valve 13 comprises an elastic leaf 134 fixed by rivets such as 135 to the rigid wall 32, which spontaneously keeps away from the second communication C2 and can become pressed against this second communication under the effect of a flow of air higher than a defined value travelling from the second working chamber T2 towards the second reaction chamber R2.

I claim:

1. A pneumatic booster comprising: a rigid casing (1) divided in leaktight fashion into at least first and second working chambers (T1, T2), the first (T1) chamber being connected to a first pressure source (D) delivering a first pressure, and the second (T2) chamber being selectively connected, by means of a three-way valve (5), to the first source (D) or to a second pressure source (A) delivering a pressure different from the first source; a moving partition (2) delimiting the two working chambers inside the casing and including a rigid skirt (3), wherein the moving partition is moved by a boost force resulting from a difference in pressure set up selectively between the two working chambers by actuation of the three-way valve; a pneumatic piston (4) capable of carrying the skirt (3) along in a first axial direction (S) and containing the three-way valve (5); an operating rod (6) accommodated in the piston and transmitting an input force controlling the actuation of the three-way valve; a push rod (7) axially movable with respect to the operating rod and transmitting an output force which is orientated in the first axial direction (S), wherein the output force is composed of the input force and the boost force; and reaction means interposed between the operating rod (6) and the push rod (7) in order to apply to the operating rod, counter to the input force, a reaction which increases with the boost force, wherein the reaction means comprise: a fixed volume (V) defined, in a central region (Z) of the skirt, between first and second rigid walls (31, 32); a moving divider (11) dividing the fixed volume (v) into first and second reaction chambers (R1, R2) respectively; first and second passages (C1, C2) respectively connecting the first working chamber (T1) and first reaction chamber (R1) together, and connecting the second working chamber (T2) and second reaction chamber (R2) together; and a selective valve (13) capable of closing the second passage (C2) at least partially in response to an air flow from the second working chamber (T2) towards the second reaction chamber (R2) being higher than a predetermined value, the first rigid wall (31) carries at least indirectly, the push rod (7) along in the first axial direction (S), and the divider (11) carries, at least indirectly, the operating rod (6) along in a direction opposite to the first axial direction.

2. A pneumatic booster according to claim 1, characterized in that the selective valve (13) comprises a shutter member (131) in the second passage (C2), urged by a valve spring (132) towards a wide open position, and moved towards a minimally open position by the flow of air traveling from the second working chamber (T2) towards the second reaction chamber (R2).

3. A pneumatic booster according to claim 1, characterized in that the selective valve (13) comprises an elastic leaf (134) biased away from the second passage (C2) and moved against the second passage by the flow of air traveling from the second working chamber (T2) towards the second reaction chamber (R2).

* * * * *